June 11, 1929.  H. R. GOTTFRIED  1,716,630
ORGAN PIPE VOICE ADJUSTER
Filed Dec. 17, 1927
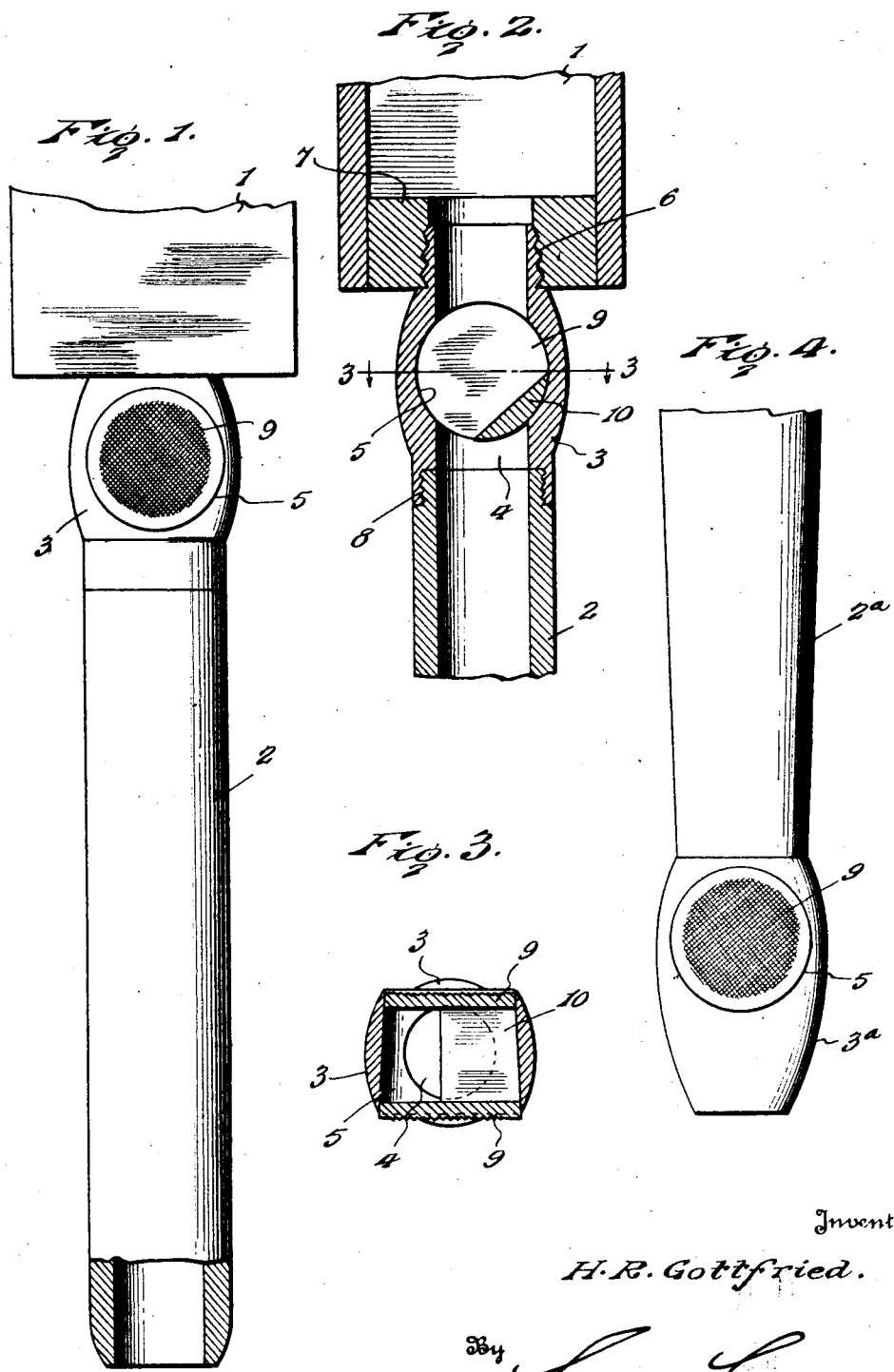
Inventor
H. R. Gottfried.
By Lacy & Lacy, Attorneys Patented June 11, 1929.

1,716,630

UNITED STATES PATENT OFFICE.

HERBERT R. GOTTFRIED, OF ERIE, PENNSYLVANIA.

ORGAN PIPE VOICE ADJUSTER.

Application filed December 17, 1927. Serial No. 240,736.

In wind musical instruments of the type embodying pipes, as for instance, an organ, foot pipes are interposed between the flow and reed pipes and the rack of the wind chest and these foot pipes are formed with an opening of a size depending upon the flow of wind therethrough to produce the required sound or tone. This opening is usually sized by being enlarged or contracted and, as a result, the operation is both tedious and time consuming and is frequently productive of waste in loss of time and material.

Therefore, it is the purpose of this invention to provide means whereby the wind opening may be easily, quickly and accurately adjusted without any chance of necessitating replacement as the easiest way of tuning in the event of the opening being over enlarged.

The invention consists of a wind opening adjuster in the length of the pipe foot, the same consisting of a casing having a flow opening for the wind and an intersecting opening of circular outline and slightly taper in its length, and a regulator snugly fitting within the tapered opening and comprising spaced disks and a chordal connector uniting the disks at corresponding marginal points.

While the drawing illustrates a perferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is an elevational view of an organ pipe foot provided with a wind opening adjuster embodying the invention, the same being shown attached to an organ pipe.

Figure 2 is a detail, sectional view of the parts illustrated in Figure 1.

Figure 3 is a transverse sectional view on the line 3—3 of Figure 2.

Figure 4 is an elevational view of a modification, showing the adjuster applied to a metal foot.

Corresponding and like parts are referred to in the following description and designated in the several views of the drawing by like reference characters.

The numeral 1 designates an organ pipe and 2 a pipe foot. These parts may be of any well known construction and are illustrated to demonstrate the application of the invention, which, as stated, consists of the adjusting means for regulating the wind opening. The relative location of the adjuster is immaterial so long as it admits of easy and quick adjustment of the wind opening.

The numeral 3 designates the body of the wind opening adjuster, the same consisting of a casing in which is formed a flow opening 4 and a regulator opening 5, the opening 4 providing a passage for the wind, and the opening 5 adapted to receive the regulator which is adjustable to vary the effective size of the wind opening. The body, or casing 3 is usually of metal, and its opposite ends may be of any construction to admit of the device being coupled to an organ pipe and the foot pipe associated therewith. As indicated most clearly in Figure 2, one end of the casing 3 is reduced and externally threaded, as indicated at 6, to make screw-threaded engagement with a block 7 fitted in the lower end of an organ pipe 1. The opening 4 extending through the lower end of the casing 3 is enlarged and internally screw-threaded, as indicated at 8, to receive the foot pipe 2.

The regulator comprises spaced disks 9 and a connection 10 uniting the disks adjacent corresponding marginal edge portions. The connection 10 is plano-convex and has a chordal disposition, whereby to obtain a snug fit against the wall of the opening 5 and to offer a minimum resistance to the flow of the wind. The regulator tapers slightly to conform to the taper of the opening 5, thereby assuring a close fit of the disks 9 and connection 10 therein. The opening 5 extends through opposite sides of the casing and is closed at its ends by the disks 9 which are readily accessible to be gripped between the digits of the hand for rotation, whereby to position the connection 10 so as to vary the effective size of the wind opening 4. The outer faces of the disks 9 are milled or roughened to enable a firm grip being obtained upon the regulator when turning the same to adjust the size of the wind opening, as occasion may require. After the regulator has been properly adjusted its position is fixed by delivering a smart tap or blow upon the larger end to cause the same to bind in the opening 5, as will be readily appreciated. Should further adjustment be desired, the regulator may be loosened by delivering a tap upon the smaller end thereof, and when adjusted is again made secure by delivering a tap upon the larger end.

In the form shown in Figure 4, the body 3ª of the device is of different formation and is coupled to a metal pipe 2ª. The body or casing has intersecting openings formed therein for the flow of the wind and to receive the regulator, such parts being substantially the same as hereinbefore described and functioning in substantially the same manner.

Having thus described the invention, I claim:

1. An adjuster for the pipes of wind musical instruments of the organ type, the same comprising a casing provided with intersecting openings, the one for flow of the wind and the other adapted to receive a regulator, and means for adjusting the wind opening comprising spaced elements and a connection joining marginal edge portions of the spaced elements, said means snugly fitting within the regulator receiving opening and rotatable to position the connection so as to vary the effective size of the wind opening, and the said connection maintaining close contact at one side with the casing at one side of the flow opening at all stages of adjustment of the regulator.

2. A wind opening adjuster for organ pipes comprising a body having a wind opening and an intersecting regulator receiving opening of circular outline and tapered in its length, and a regulator snugly fitting within said opening and comprising spaced disks and a chordal connection uniting marginal edge portions of the disks and of plano-convex form.

3. Means for adjusting the wind opening of an organ pipe, the same comprising a casing having a wind opening and an intersecting regulator opening which tapers throughout its length and extends through opposite sides of the casing, and a tapered regulator rotatably fitted within the regulator opening, and comprising spaced disks having their outer sides roughened and a chordal connection uniting marginal edge portions of the disks.

In testimony whereof I affix my signature.

HERBERT R. GOTTFRIED. [L. S.]